United States Patent
Tomomitsu et al.

[15] 3,648,579
[45] Mar. 14, 1972

[54] EXPOSURE METER HAVING BATTERY VOLTAGE COMPENSATING DEVICE

[72] Inventors: Toshio Tomomitsu; Tatsuo Fujii, both of Tokyo, Japan

[73] Assignee: Nippon Kogaku K.K., Tokyo, Japan

[22] Filed: Jan. 6, 1970

[21] Appl. No.: 904

[30] Foreign Application Priority Data

Jan. 10, 1969  Japan......................................44/1681
Jan. 10, 1969  Japan......................................44/1682
Jan. 10, 1969  Japan......................................44/1683

[52] U.S. Cl. ..............................95/10 C, 324/115, 324/130, 356/224, 356/226, 356/228
[51] Int. Cl.......................G01j 1/00, G01j 1/42, G01j 1/44
[58] Field of Search..................356/224, 226, 227, 228, 229; 324/130, 154, 115; 95/10 C

[56] References Cited

UNITED STATES PATENTS

| | | | |
|---|---|---|---|
| 698,647 | 4/1902 | Duncan .................................324/115 |
| 2,481,678 | 9/1949 | Mihalyi..............................324/115 X |
| 2,509,485 | 5/1950 | Dalzell................................324/115 X |
| 3,194,134 | 7/1965 | Swarofsky et al. .....................95/10 C |
| 3,308,377 | 3/1967 | Lukso et al. ............................324/115 |
| 3,312,897 | 4/1967 | Fingerett ................................324/115 |
| 3,379,107 | 4/1968 | Lieser et al..............................95/10 C |
| 3,421,006 | 1/1969 | Hahn .....................................356/226 |

*Primary Examiner*—Ronald L. Wibert
*Assistant Examiner*—Warren A. Sklar
*Attorney*—Ward, McElhannon, Brooks & Fitzpatrick

[57] ABSTRACT

An exposure meter in which a voltage compensation setting device displaces a fixed index mark in the case of a fixed mark coincidence type exposure meter, varies the deflection of a following pointer upon one step variation of the exposure factor in the case of a follow the pointer type exposure meter or varies the spacings between the graduated scale marks in the case of a graduated scale mark direct reading type exposure meter. The displacement of said setting device is limited to a position where the battery voltage check pointer stops upon the battery voltage check, whereby said fixed index mark may be displaced until it coincides with said pointer at said position, said deflection of said following pointer upon one step variation of the exposure meter may coincide with that of said pointer for a unit of brightness of light or said scale marks graduated or calibrated in accordance with the voltage of the battery used may be indicated to compensate the voltage drop or variation of the battery.

8 Claims, 14 Drawing Figures

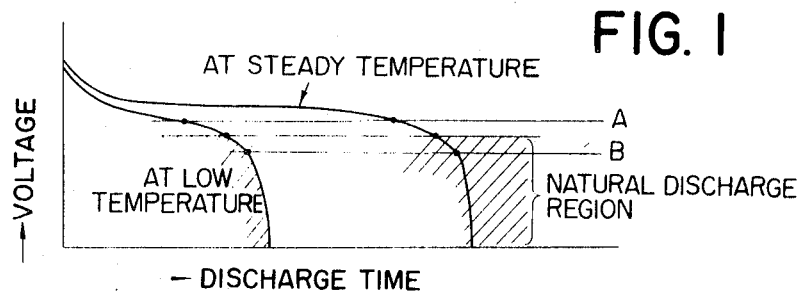
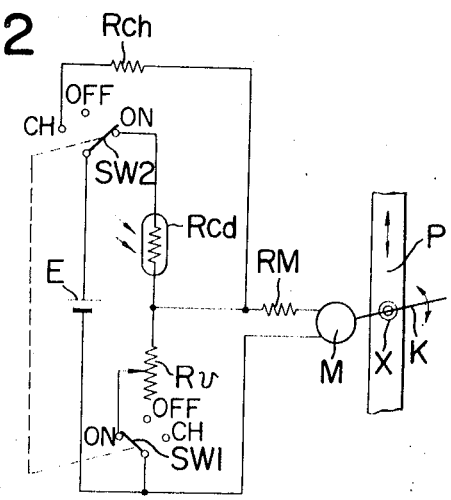
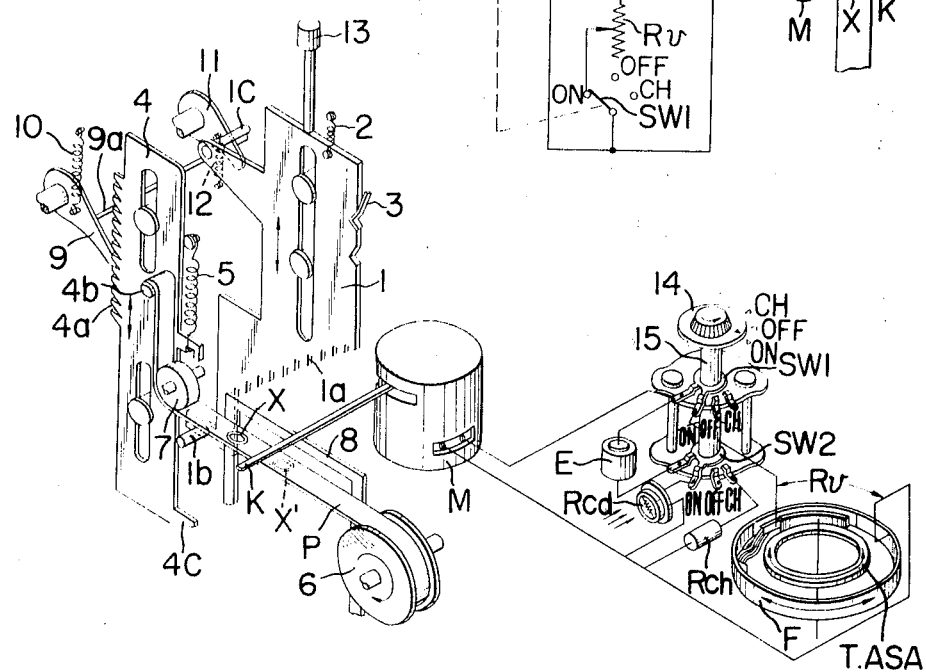

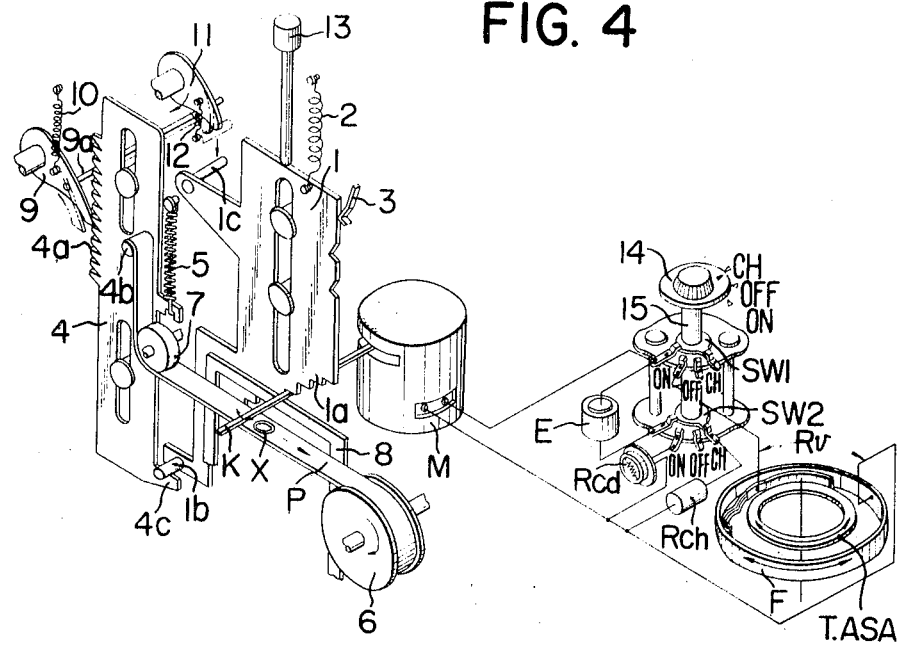

EXPOSURE METER HAVING BATTERY VOLTAGE COMPENSATING DEVICE

BACKGROUND OF THE INVENTION

The present invention relates to an exposure meter utilizing as a power source a battery such as a mercury battery, silver battery or the like.

In a conventional exposure meter of the type described, the voltage of the battery varies in response to the secular change and the temperature variation so that the pointer will not indicate a correct value, thereby causing an error in measuring the brightness of light for photography. No device has been proposed for compensating or correcting such error even though devices for checking the voltage of the battery have been well known in the art.

In view of the above, the present invention has for its object to provide a device for mechanically compensating for the voltage variation of the battery in the exposure meter of the type described.

SUMMARY OF THE INVENTION

According to the present invention, in the case of a fixed index mark coincidence type exposure meter, mechanical compensation for battery voltage variation may be effected by depressing a voltage compensating button or rotating a circuit-change-over switch so that the indication error of the pointer due to the voltage variation (generally voltage drop) of the battery may be eliminated when measuring the brightness of light, thereby ensuring the correct exposure.

In the case of a follow the pointer type exposure meter, the voltage variation of the battery may be compensated for by coinciding the following pointer with the battery check pointer, thereby ensuring the correct exposure.

In the case of a graduated scale mark direct reading type exposure meter, the spacings between the scale marks may be varied in accordance with the voltage variation so as to compensate for the voltage variation, thereby eliminating the error in measuring the light.

One of the remarkable features of the present invention resides in the fact that a battery whose voltage has dropped to some extent or a battery having a different rated voltage (for example 1.3 V. and 1.5 V.) may be used in a satisfactory manner in an exposure meter.

In brief, according to the present invention in the case of a fixed index mark type exposure meter, a voltage compensation setting device for displacing the fixed index mark is so arranged and constructed that its displacement is controlled so as to correspond with the deflection of a battery voltage check pointer, thereby compensating for the voltage drop or variation of the battery.

In the case of a follow the pointer type exposure meter, a voltage compensation setting device for varying an angle of deflection of a following pointer when the exposure factor such as shutter speed, film sensitivity, aperture, etc., is varied by one step (for example when the shutter speed is varied from one one hundred and twenty-fifth sec. to one two hundred and fiftieth sec.) is also so arranged and constructed that its displacement is controlled so as to correspond with the deflection of a battery voltage check pointer whereby said deflection of the following pointer for variation of one step of the exposure factor may be made coincident with that of the check pointer for variation of one unit of the brightness of light in response to the displacement of the voltage compensation setting device, thereby compensating for the voltage drop or variation of the battery.

In the case of a graduated scale mark direct reading type exposure meter, a similar voltage compensation setting device for actuating a scale indicator so as to vary (increase or decrease) the spacings between the scale marks graduated for giving the correct reading through the reference line or the like in accordance with the voltage variation of the battery is also so arranged and constructed that its displacement is controlled so as to correspond with the deflection of a battery voltage check pointer whereby said scale indicator may be displaced in response to the displacement of the setting device so as to give the correct reading of the battery voltage, thereby compensating the voltage drop or variation of the battery.

The above and other objects, features and advantages of the present invention will become more apparent from the following description of the illustrative embodiments thereof taken in conjunction with the accompanying drawings.

BRIEF DESCRIPTION OF THE ACCOMPANYING DRAWINGS

FIG. 1 is a discharge curve of a typical mercury or silver battery,

FIG. 2 is a circuit diagram illustrating a conventional fixed index mark coincidence type light measuring circuit and its battery voltage checker circuit, FIG. 3 is a perspective view of a first embodiment of the present invention illustrating the inoperative state, FIG. 4 is a view similar to FIG. 3 but illustrating the operative state thereof, FIG. 5 is a perspective view of a second embodiment of the present invention, FIG. 6 is a circuit diagram illustrating a conventional follow the pointer type light measuring circuit and its battery voltage checker circuit, FIG. 7 is a graph showing the relation between the angles of deflection of the pointers (ordinate) and the brightness of light and the variation of the exposure factor (abscissa), FIG. 8 is a perspective view of a third embodiment of the present invention illustrating its inoperative state, FIG. 9 is a view similar to FIG. 8 but illustrating its operative state, FIG. 10 is a circuit diagram illustrating a conventional graduated scale mark direct reading type light measuring circuit and its battery voltage checker circuit, FIG. 11 is a perspective view of a fourth embodiment of the present invention illustrating its inoperative state, FIG. 12 is a view similar to FIG. 11 but illustrating its operative state, FIG. 13 is an explanatory view showing the battery check pointer and the scale drum of the fourth embodiment, and FIG. 14 is an explanatory view showing the scale reading window and the scale marks viewed therethrough.

DESCRIPTION OF THE PREFERRED EMBODIMENTS

Figure 6:
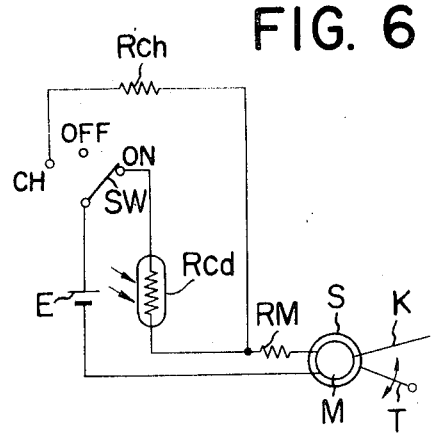
Figure 10:
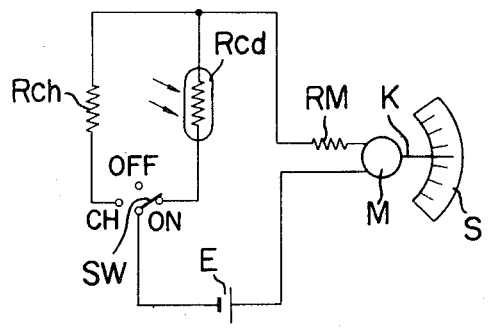

Prior to the description of the present invention, a conventional exposure meter and its checker will be described briefly for better understanding of the invention.

Referring to FIG. 1, the point A designates the minimum end voltage point or so-called "check point" of a battery of a conventional exposure meter set immediately before the discharge curve reaches the "self discharge" region. The point B designates the minimum end voltage point of an exposure meter according to the present invention set within the "self discharge" region.

Referring to FIG. 2, Rcd designates a CdS cell; Rv, a variable resistor actuated in response to the variation of exposure determination factors such as shutter speeds, film sensitivity, aperture stops, etc.; M, an indicator having a pointer K; RM, an internal resistance of the indicator M; P, a movable band having a fixed index X marked thereupon; E, a power source battery; and SW1 and SW2, changeover switches interlocked with each other. The above components constitute the so-called fixed-point-coincidence type exposure meter circuit. Rch designates a fixed resistance and constitutes a source battery voltage checker device together with the circuit consisting of the indicator M, the internal resistance RM, the battery E and the switches SW1 and SW2, the pointer K, the movable band P and the fixed index X.

Referring to FIG. 3, showing one embodiment of the present invention, a voltage compensation setting plate 1 (to be referred to as "adjustment plate or member") is attached to the camera body for slidable movement in the directions indicated by the double-pointed arrow. The adjustment plate 1 has a stepped cam portion 1a formed along one side edge thereof opposing the pointer K. A connecting pin 1b extends from one end portion of the adjustment plate 1 for engagement with an engaging member 4C of a fixed index mark band actuating plate 4. An actuating pin 1c extends from the other end of the adjustment plate 1 for engagement with a release lever 11 to be described in more detail hereinafter. The adjustment plate 1 is normally biased to move upwardly by means of a spring 2. One end of a click spring 3 is fixed to the main body while the other end is adapted to engage with a click groove formed in one side edge of the adjustment plate 1. An engaging plate 8 is fixed to the main body and is adapted to stop the downward movement of the adjustment plate 1 through the stepped cam 1a in cooperation with the pointer K.

When the point k swings into its position upon checking the voltage of the battery, the adjustment plate 1 is moved downward until the stepped cam 1a engages the pointer k. The fixed point actuating plate 4 is attached to the camera body for slidable movement in the directions indicated by the double pointed arrow and has a ratchet rack 4a for engagement with a ratchet pawl 9 at side edge thereof and a support pin 4b fixed thereto for retaining one end of the movable band P. An engaging member 4c is formed on the fixed point actuating plate 4 to engage with the adjustment plate 1 through the connecting pin 1b. The fixed index actuating plate 4 is normally biased upwardly by a spring 5. The other end of the movable band P is fixed on a winding drum 6. The winding drum 6 is biased so as to rotate in the direction indicated by the arrow for normally winding the movable band P therearound. A guide roller 7 is provided for changing the direction of the movable band P.

The ratchet pawl 9 adapted to stop the upward movement of the fixed index actuating plate 4 has a connecting rod 9a fixed thereto for engagement with the release lever 11 and is normally so biased as to rotate in the counterclockwise direction by a spring 10. The release lever 11 is rotatably pivoted to the main body and is biased to rotate in the clockwise direction by a spring 12 weaker than the spring 10.

Upon downward movement of the adjustment plate 1, the release lever 11 is caused to rotate in the clockwise direction through the actuating pin 1c so that the ratchet pawl 9 may be rotated so as to disengage from the rack 4a through the connecting rod 9a.

A voltage compensating button 13 is fixed to the adjustment plate 1 so as to cause it to move downwardly. The above described parts from 1 to 13 constitute the voltage compensating device which displaces the fixed index X upon the movable band P to the position at which the pointer K stops upon voltage check by the fixed index actuating plate 4 interlocked with the adjustment plate 1 when the displacement or movement of the adjustment plate 1 is controllably stopped by the engagement of the cam 1a with the pointer K. A circuit-change-over knob 14 is fixed to the top end of a rotary shaft 15 to which are fixed the changeover switches SW1 and SW2. A resistance ring F is interlocked with an aperture setting ring (not shown) and is rotatable in the directions indicated by the double-pointed arrow. A brush ring T.ASA which is interlocked with the setting of both the shutter speed and the film sensitivity is provided rotatably coaxially on the resistor ring F. Thus, the resistor ring F and the brush ring T.ASA constitute the variable resistor Rv.

In the second embodiment of the present invention illustrated in FIG. 5, instead of the compensating button 13 of the first embodiment shown in FIGS. 3 and 4, the circuit-change-over knob 14 is so constructed and arranged that when the knob 14 is switched to the contact CH for power battery voltage check, the adjustment plate 1 is caused to move downwardly. A ring 16 is provided so as to slidable axially on the rotary shaft 15 and is biased to move upwardly by means of a spring 17. An interlocking lever 18 is pivotably fixed on to the main body and has a roller 18a rotatably fixed one end thereof for engaging the cam ring 16 and the other end of the lever 18 engages pin 1d which extends from the adjustment plate 1.

When the circuit-change-over knob 14 is switched to the contact CH, the interlocking lever 18 is caused to rotate in the direction indicated by the arrow through the engagement of the roller 18a with the cam ring 16 so that the adjustment plate 1 may be caused to move downwardly. When the adjustment plate 1 is stopped during the rotation of the interlocking lever 18, the cam ring 16 is provided to move downwardly against the spring 17.

Next the mode of operation of the device of the present invention having the construction as described hereinabove will be described.

Let it be assumed that when the knob 14 is switched to the contact CH for checking the voltage of the battery E, the pointer K stops at a position indicated by X', without aligning with the fixed index mark X because of the voltage drop, as shown in FIG. 3.

In this case, in the first embodiment, the compensating button 13 is depressed while in the second embodiment, the knob 14 is switched to the contact CH. Then, the adjustment plate 1 is caused to move downwardly as described above and the actuating pin 1c causes the release lever 11 to rotate in the direction indicated by the arrow as best shown in FIG. 4 so that the ratchet pawl 9 is rotated to disengage from the ratchet rack 4a. Thus, the fixed index mark actuating plate 4 is caused to move upwardly by the spring 5 and then is stopped by the pin 1b of the adjustment plate 1. Thereafter, the index mark actuating plate 4 is caused to move downwardly again together with the adjustment plate 1 until the stepped cam 1a thereof engages with the pointer K. In this case, because of the downward movement of the actuating plate 4 and the winding drum 6 which is normally biased to rotate in the direction indicated by the arrow, the movable band P is caused to move in the direction indicated by the arrows until the fixed index mark X aligns with the pointer K, whereby the voltage drop of the battery E is compensated for.

Upon release of the button 13, the adjustment plate 1 is caused to move upwardly and return to its initial position as shown in FIG. 3 by the spring 2 while the fixed index mark actuating plate 4 is held in voltage compensating position by means of the ratchet pawl 9.

Figure 7:
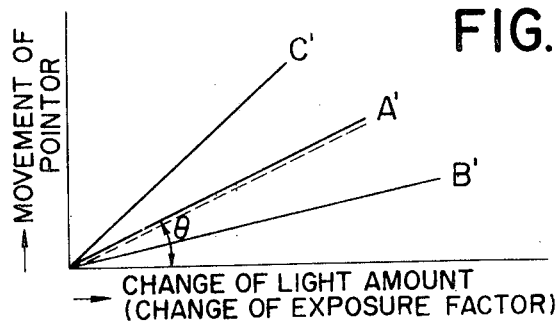
Figure 8:
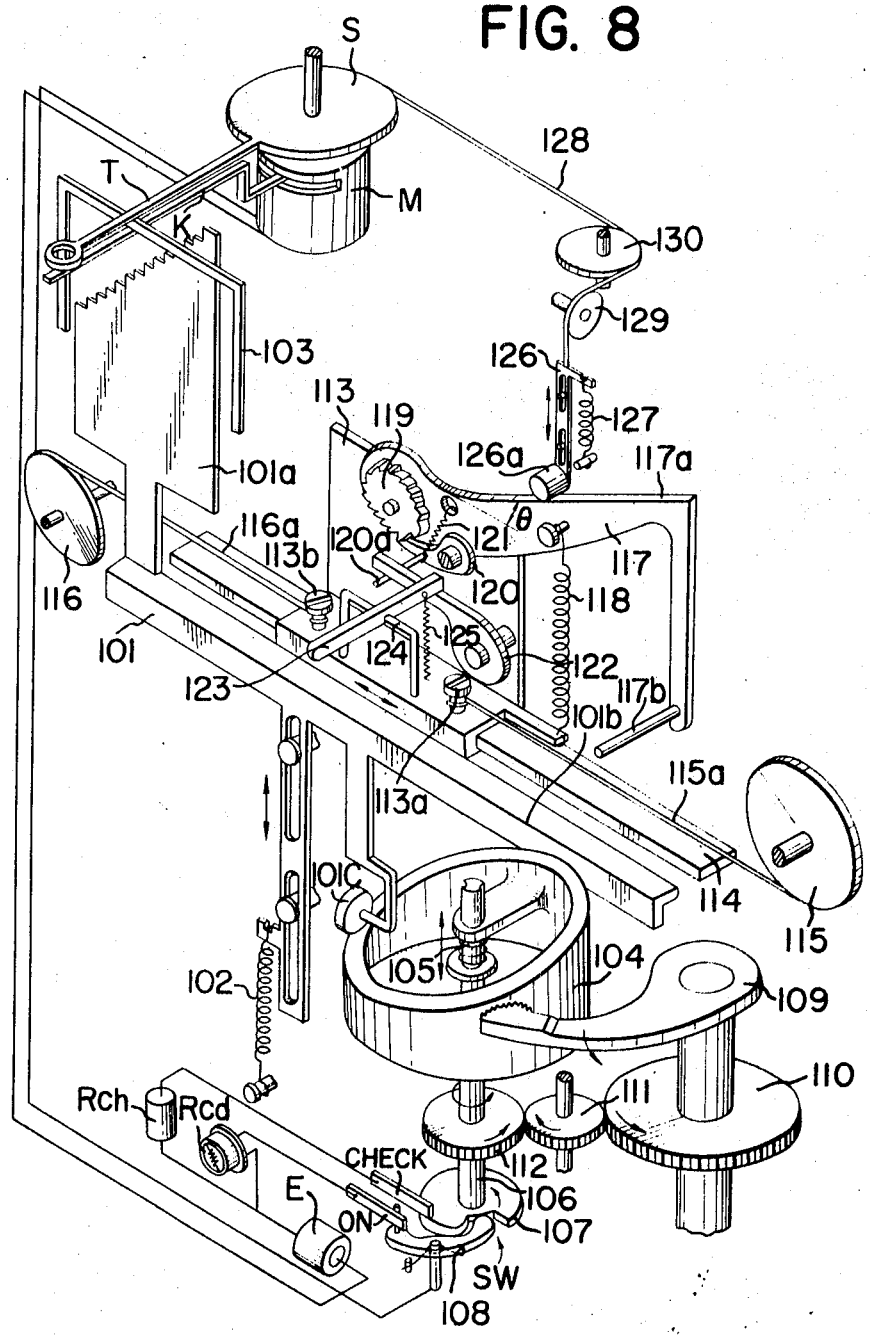
Figure 9:
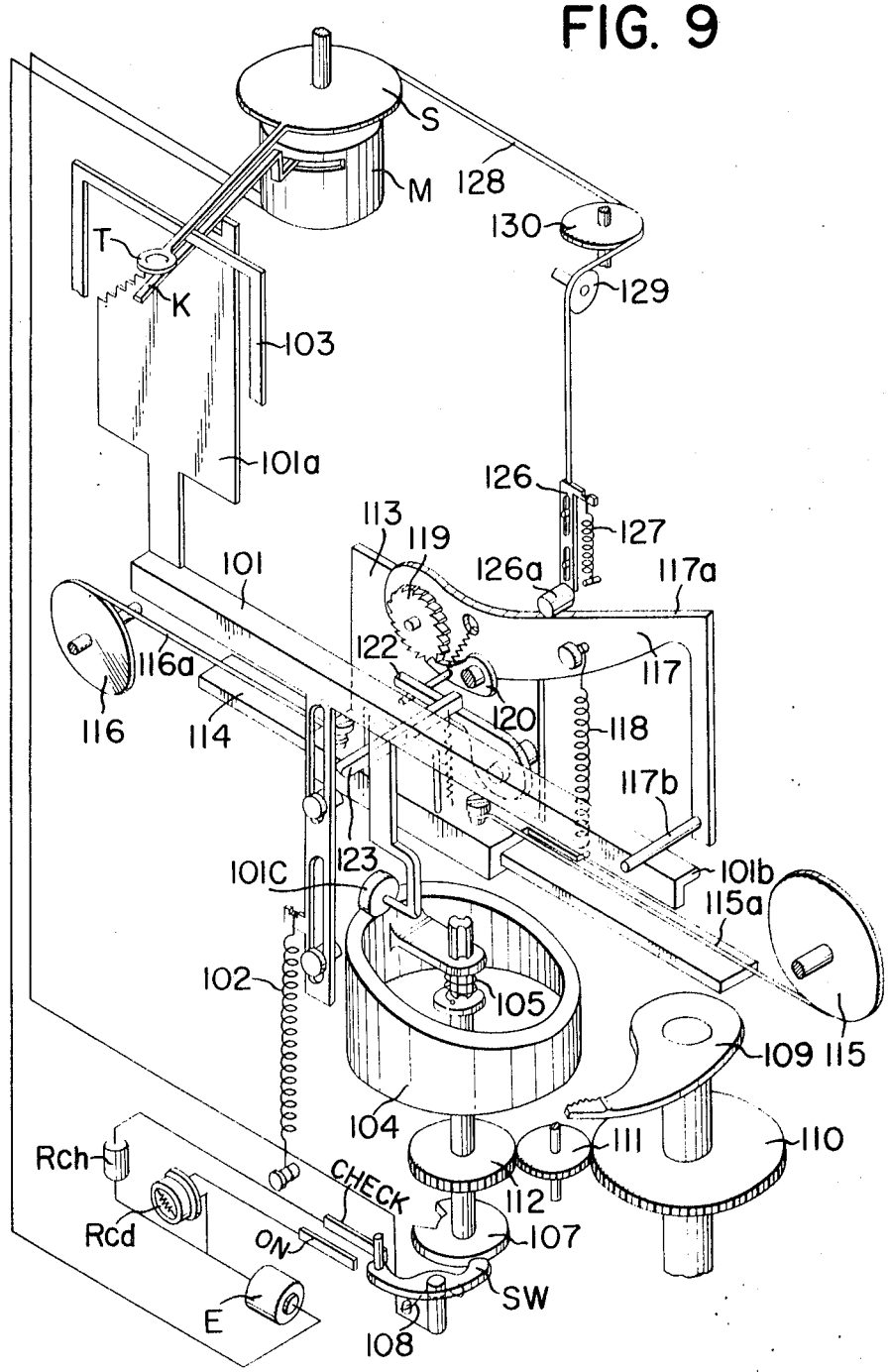

Next with reference to FIGS. 6, 7 and 8, the third embodiment of the present invention will be described. The same reference characters are used to designate the same parts throughout the figures, and the check point (the minimum end voltage setting) is the same as in the case of the first embodiment.

The so-called follow the pointer type exposure meter consists of the CdS cell (Rcd), the indicator M having the pointer K, the internal resistance RM, the battery E, the changeover switch SW and a following pointer disk S having a following pointer T moved in the directions indicated by the double-pointed arrow in response to the variation of exposure setting factors such as the shutter speeds, film sensitivity, aperture/stop, etc. The battery voltage checker circuit consists of a fixed resistance Rch, the indicator M, the internal resistance RM, the following pointer disk S, the following T and the battery E.

In the case where the exposure meter has the electric circuit as shown in FIG. 6, when the changeover switch Sw is switched to the contact ON to actuate the exposure circuit for brightness measurement, the pointer K only deflects through an angle in proportion to the variation of the resistance of the CdS cell Rcd, but the angle of the deflection is in proportion to the voltage of the battery E. In other words, the deflection of the pointer K is proportional to the intensity of the light incident upon the CdS cell Rcd, but is not always constant for a predetermined intensity of light and varies in proportion to the voltage of the battery E. On the other hand the deflection of the following pointer T in response to the variation of the exposure setting factors such as film sensitivity, shutter speeds, aperture, etc., is maintained mechanically constant for a predetermined exposure setting. As shown in FIG. 7, the deflection of the pointer K for variation of a unit of brightness of light from a subject to be photographed with a standard voltage coincides with the deflection of the following pointer T when the exposure factor is varied by one stop. (See Curve A') On the other hand, when the battery voltage is increased or decreased, the deflection of the pointer K for variation of one unit of brightness of light deviates widely from that of the following pointer T when the exposure factor is varied by one step as shown by curves B' and C'. Therefore, even if the following pointer is made coincident with the pointer K, the exposure meter will bring about the error or deviation in the exposure setting factors to be corrected in response to the variation of the brightness of light from the subject.

In view of the above, the present invention contemplates eliminating such error completely by making the deflection of the following point T proportional to the voltage when the exposure factor is varied by one step by rendering the exposure factor setting mechanism to be responsive to the voltage variation of the battery. In other words, the deflection of the following pointer T for variation of the exposure factor by one step is made proportional to that of the pointer K for variation of one unit of brightness under varied voltage.

The third embodiment will be described with reference to FIG. 8. An adjustment member 101 is attached to the main body for slidable movement in the directions indicated by the double-pointed arrow and carries a stepped cam member 101a fixed to one end thereof in opposed relation to the pointer K. From the intermediate portion of the adjustment member 101 there extends an arm having a roller 101c rotatably fixed thereto for engagement with a cam ring 104 to be described hereinafter in more detail. The adjustment member 101 is normally biased downwardly by a spring 102. The other end portion 101b of the adjustment member 101 is so formed as to engage with a connecting rod or pin 117b extending from a following pointer adjustment member 117 for actuating it. An engaging member 103 fixed to the main body is adapted to stop the upward movement of the adjustment member 101 through the stepped cam member 101a in cooperation with the pointer K. The cam ring 104 is carried for rotation by a rotary shaft 106 which in turn is rotatably fixed to the main body. The cam ring 104 is so arranged as to be slidable in the directions indicated by the double-pointed arrow and is normally biased upwardly by a spring 105. A cam plate 107 is fixed to the rotary shaft 106. The changeover switch Sw is biased to rotate in the direction indicated by the arrow by a spring 108 so as to contact with a contact ON, thereby closing the exposure meter circuit.

When a shutter charging lever 109 interlocked with the film advance mechanism and a shutter (not shown) is rotated in the direction indicated by the arrow, the rotary shaft 106 is caused to rotate through a gear train from 110 to 112 so that the switch Sw closes the contact CHECK of the voltage checker circuit, thereby closing the battery voltage checker circuit. Simultaneously, the adjustment member 101 for voltage compensation setting is caused to move upwardly by the rotation of the cam ring 104 and when the adjustment plate 101 is stopped by the pointer K, the cam ring 104 is caused to move downwardly against the spring 105.

By one rotation of the rotary shaft 106, the switch Sw sequentially closes the brightness metering circuit, the battery voltage checker circuit and the brightness metering circuit again. The above described components from 101 to 108 and the switch Sw are so arranged that the adjustment member 101 is caused to move upwardly in response to the circuit switching operations as described above and its movement may be limited by the engagement of the stepped cam member 101a with the pointer K when it is rotated and stopped upon the battery voltage check.

A following pointer actuating member 113 is carried by a guide member 114 fixed to the main body for slidable movement in the directions indicated by the double-pointed arrow. The following pointer actuating member 113 is coupled to a winding wheel 116 and an actuating wheel 115 to be rotated in response to the variation of exposure factors such as shutter speed, film sensitivity, aperture, etc., through pins 113a and 113b extending from both of the end portions of the member 113, respectively, and ropes 115a and 116a to be described hereinafter. An actuating wheel 115 and winding wheel 116 are interlocked with the exposure factor such as shutter speed, film sensitivity, aperture, etc. The winding wheel 116 is normally biased to rotate in the counterclockwise direction so as to wind the rope 116a. A following pointer adjustment member 117 is rotatably pivoted to the actuating member 113 and the upper edge thereof has a cam portion 117a which is adapted to make the deflection of the following pointer T when the exposure factor is varied by one step, coincident with that of the pointer K for variation of unit of brightness in proportion to the standard or reference voltage of the battery E. From the leading end of the cam portion 117a there extends downwardly the connecting rod 117b for engagement with the adjustment member 101. The adjustment member 117 is normally biased to rotate in the clockwise direction by a spring 118. When the upward sliding movement of the adjustment member 101 is stopped by the engagement of its stepped cam portion 101a with the pointer K, the adjustment member 117 causes a variation of the angle of inclination $\theta$ of the cam 117a in response to the movement of the adjustment member 101. That is, when the exposure factor is varied by one step, the deflection of the following pointer T is made coincident with that of the pointer K for variation of unit of brightness and in proportion to the voltage variation of the battery voltage E.

A ratchet wheel 119 is fixed to the following pointer adjustment member 117 in coaxial relation with the axis of roration thereof and engages with a ratchet pawl 120 pivotably fixed to the actuating member 113. From the pawl 120 there extends an engaging pin 120a. The pawl 120 is normally biased to rotate in the clockwise direction by means of a spring 121, so that the rotation in the clockwise direction of the ratchet wheel 119 may normally be prevented. A release lever 122 is rotatably pivoted to the actuating member 113 and the free end of the release lever 122 is in engagement with the engaging pin 120a of the ratchet pawl 120. A rocking arm 123 is rotatably carried by a support member 124 fixed to the actuating member 113 and one end of the rocking arm 123 engages with the adjustment member 101 while the other end thereof engages with the release lever 122. The rocking arm 123 is normally biased to rotate in the clockwise direction by means of the spring 125 and rotates in the clockwise direction in response to the upper movement of the adjustment member 101 so that the rotation of the ratchet wheel 119 in the clockwise direction may be permitted through the release lever 122 and the engaging pin 120a.

The above-described components or parts from 119 to 125 are so arranged that the reverse rotation (in the clockwise direction) of the following pointer adjustment member 117 is normally prevented, but may be permitted in response to the upward movement of the adjustment member 101. A sliding member 126 is slidably attached to the main body for slidable movement in the directions indicated by the double-pointed arrow. At one end of the sliding member 126 is rotatably fixed a roller 126a while at the other end is fixed one end of a following pointer actuating string 128 the other end of string 128 is connected to a following pointer disk S which is pivoted to the main body. The roller 126a is adapted to engage with the engaging surface 117a. The sliding member 126 is normally biased downwardly by means of a spring 127. Wheels 129 and 130 are provided for changing the direction of the string 128.

The above-described parts from 101 to 108, the switch Sw and parts 113, 117 to 130 constitute a voltage compensating indication setting device of the type in which when the movement of the adjustment member 101 is stopped by the engagement of the stepped cam portion 101a with the pointer K upon movement thereof for battery voltage check, the deflection of the following pointer T upon variation of the exposure factor by one step may be made coincident with that of the pointer K for variation of a unit of brightness.

Next, the mode of operation will be described hereinafter. When the winding or charging lever 109 is rotated in the direction indicated by the arrow, the rotary shaft 106 is caused to rotate in the direction indicated by the arrow through the gear train from 110 to 112 so that the switch Sw closes the contact CHECK of the voltage checker circuit by the rotation of the cam plate 107. Thus, the pointer K deflects and stops at a position in proportion to the voltage of the battery E. Upon rotation of the rotary shaft 106, the cam ring 104 rotates so that the adjustment member 101 is caused to move upwardly while the rocking arm 123 is caused to rotate in the clockwise direction by the engagement thereof with the adjustment member 101. Therefore, the rotation in the clockwise direction of the following pointer adjustment member 117 is permitted through the parts from 122 to 119 so that the adjustment member 117 is caused to rotate in the clockwise direction while the connecting pin 117b engages with the actuating portion 101b of the adjustment member 101. Consequently the rotation of the member 117 is limited and then caused to rotate in the counterclockwise direction together with the adjustment member 101. When the movement of the adjustment member 101 is stopped by the engagement of the stepped cam portion 101a with the pointer K and when the adjustment member 117 rotates through such an angle that the deflection of the following pointer T upon one step variation of the exposure factor through the cam 117a and the roller 121a may be made coincident with that of the pointer K for a unit of brightness variation, the adjustment member 117 is stopped by the ratchet claw or pawl 120 so that the error in measuring the voltage variation of the battery E may be corrected. Upon completion of the actuation of the winding or charging lever 109, the adjustment member 101 is caused to move downwardly because of the relation of engagement of the cam ring 104 with the roller 101c and the spring 102 while the switch Sw closes the contact ON of the brightness measurement circuit because of the engagement of the cam plate 107, thereby closing this circuit.

Next, the fourth embodiment of the present invention will be described with reference to FIGS. 10 to 14. The so-called scale mark direct reading type exposure meter circuit comprises a CdS cell Rcd, an indicator M having a pointer K, its internal resistance RM, a battery E and a changeover switch Sw. A battery voltage checker circuit is consisting of a fixed resistance Rch, the indicator M, its internal resistance RM and the battery E. Reference character S designates a graduated scale plate.

In the case of the scale mark direct reading type exposure meter having the circuits described above and shown in FIG. 10, when the switch Sw is switched to the contact ON of the brightness measurement circuit, thereby closing the circuit, the pointer K deflects in proportion to the variation in resistance of the CdS cell Rcd and the deflection is in proportion to the voltage of the battery E while the scales are graduated with equal spacing. That is, the deflection of the pointer K in proportion to the variation of light incident upon the CdS cell Rcd is not always constant for a predetermined brightness, but is subject to the variation in voltage of the battery E, thus causing the error in indication of the scale by the pointer K.

In view of the above, the present invention contemplates to eliminate the error as described above by actuating the mechanism for varying the scale spacing in response to the voltage variation of the battery, thereby making the scale marks spaced apart from each other in proportion to the voltage.

Figure 11:
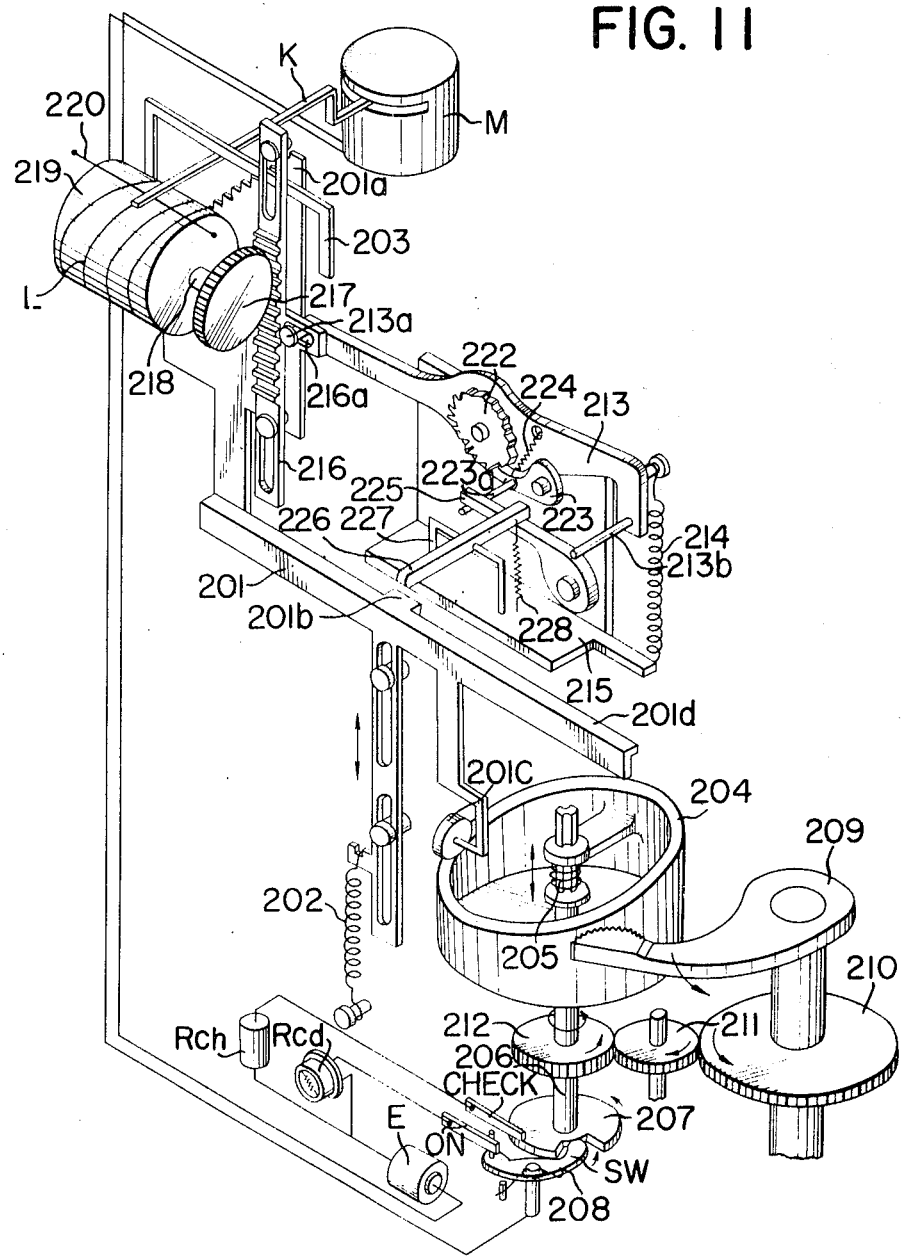

Referring to FIG. 11, an adjustment member 201 is attached to the main body for slidable movement in the directions indicated by the double-pointed arrow. At one end thereof is formed a stepped cam member 201a in opposed relation with the pointer K; at the intermediate portion thereof, an engaging portion 201b for engagement with a connecting lever 226 to be described hereinafter in more detail and a depending member having at the free end thereof a roller 201c for engagement with a cam ring 204; and at the other end thereof, an actuating member 201d for engagement with an engaging pin 213b extending from a scale mark actuating member 213 to be described in more detail hereinafter so as to actuate the same. The adjustment member 201 is normally biased downwardly by means of a spring 202.

An engaging member 203 is fixed to the main body for limiting the upward movement of the adjustment member 201 through the engagement of the stepped cam member 201a with the pointer K. The cam ring 204 is carried by a rotary shaft 206 for rotation as one body therewith, the rotary shaft 206 being rotatably pivoted to the main body. The cam ring 204 is also adapted to slide vertically along the rotary shaft 206 as indicated by the double-pointed arrow, and is normally biased upwardly by means of a spring 205. A cam plate 207 is fixed to the rotary shaft 206. The changeover switch Sw is normally biased in the direction indicated by the arrow by means of a spring 208 so as to close the contact ON thereby closing the brightness measuring circuit.

When a charging or winding lever 209, drivingly interlocked with the film winding and shutter charging mechanism (not shown), is rotated in the direction indicated by the arrow, the rotary shaft 206 is caused to rotate in the direction indicated by the arrow through a gear train from 210 to 212 so that the switch Sw is caused to close the contact CHECK of the battery voltage checker circuit. Upon rotation of the cam ring 204, the adjustment member 201 is caused to move upwardly and is stopped when the pointer K engages with the stepped cam member 201a so that the cam ring 204 is caused to move downwardly by means of the spring 205.

The switch Sw is caused to close the brightness measuring circuit, the battery voltage checker circuit and then the brightness measuring circuit again in response to the rotation of the rotary shaft 206.

The above described components or parts from 201 to 208 and the switch Sw are so arranged and constructed that the adjustment member 201 is caused to move upwardly in response to the circuit changeover operation and its upward movement is limited by the engagement of the stepped cam member 201a with the pointer K when it is deflected for battery voltage check.

A graduated mark indicator actuating member 213 is rotatably pivoted at the center portion thereof to a mount plate 215 which in turn is fixed to the main body. Extending from one end of the actuating member 213 is an engaging pin 213a which fits into an elongated slot 216a of a rack 216 to be described in more detail hereinafter, and at the other end of the member 213 is, a connecting pin 213b for engagement with the actuating member 201d of the adjustment member 201. The actuating member 213 is normally biased to rotate in the clockwise direction by means of a spring 214. The rack 216 is fitted to the main body for vertically slidable movement and has a protruded member extending from the intermediate portion thereof and having the above-described elongated slot 216a. A pinion 217 in mesh with the rack 216 is carried rotatably by a rotary shaft 218 which in turn is rotatably pivoted to the main body.

Figure 13:
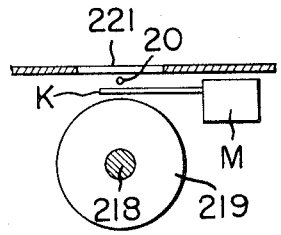
Figure 14:
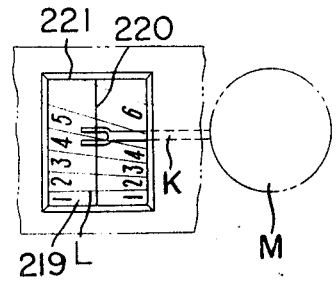

The rotary shaft 218 carries also a graduated scale indicator 219 having the corrected scale lines L graduated according to the voltage variation (voltage drop or rise) of the battery E as best shown in FIG. 14. A reading or reference line 220 is interposed between said indicator 219 and the reading window 221 formed in the main body as best shown in FIGS. 13 and 14.

The above-described parts 213 to 218 are so arranged and constructed that until the time when the upward movement of the adjustment member 201 is stopped by the engagement of the stepped cam member 201a with the pointer K, the indicator 219 has been rotated through the above described parts 213b, 213, 213a, 216, 217 and 218 by the sliding movement of the adjustment member 201 so that the correction scale marks L may be displaced relative to the reading line 220.

A ratchet wheel 222 is rotatably carried by the same rotary shaft carrying the actuating member 213 in unitary construction therewith. A ratchet pawl 223 is pivotably fixed to the mount plate 215 for engagement with the ratchet wheel 222 and has an engaging pin 223a and is biased normally to rotate in the clockwise direction by means of a spring 224 so that the free rotation in the clockwise direction of the ratchet wheel 222 may be prevented.

A release lever 225 is rotatably pivoted to the mount plate 215 and has its free end engaged with the engaging pin 223a of the pawl 223. A rocking lever 226 is rotatably pivoted to a support member 227 which in turn is fixed to the mount plate 215. One end of the rocking lever 226 engages with the adjustment member 201 while the other end thereof, engages with the release lever 225. The rocking lever 226 is normally biased to rotate in the clockwise direction by means of a spring 228 and is adapted to rotate in this direction in response to the upward movement of the adjustment member 201 so that the free rotation in the clockwise direction of the ratchet wheel 222 may be permitted through the release lever 225 and the pawl 223a.

The above-described parts from 222 to 228 are so arranged and constructed that they may prevent the reverse (in the clockwise direction) rotation of the adjustment member 213, but permit its rotation in response to the upward movement of the adjustment member 201.

The above-described parts from 201 to 208, the switch Sw, the parts 213 to 218 and 222 to 228 constitute the voltage compensation setting device of the type in which when the upward movement of the adjustment member 201 is stopped controllably by the engagement of the stepped cam member 201a with the pointer K when it is deflected upon the battery voltage check, the corrected scale lines L graduated in accordance with the voltage of the battery used for rotation of the graduated scale mark indicator 219 interlocked with adjustment member 201 may be displaced suitably relative to the reading line 220 by the indicator actuating member 213, thereby giving the correct reading.

Figure 12:
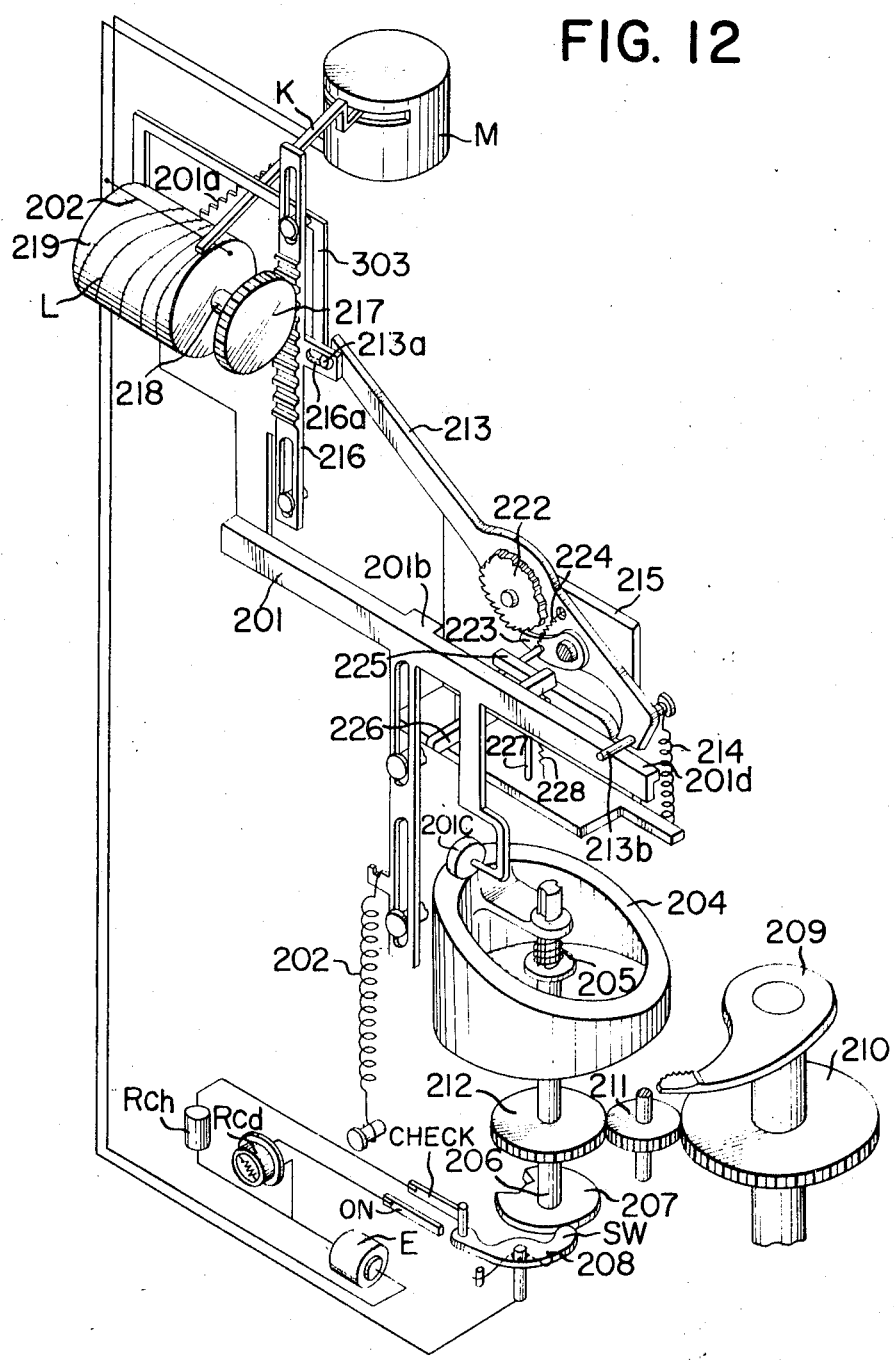

Next, the mode of operation will be described. When the winding or charging lever 209 is rotated in the direction indicated by the arrow, the rotary shaft 206 is caused to rotate in the direction indicated by the arrow through the gear train from 210 to 212 so that the switch Sw closes the contact CHECK of the voltage checker circuit by the rotation of the cam plate 207, whereby the pointer K is deflected through an angle in proportion to the voltage of the battery E. On the other hand, upon rotation of the rotary shaft 206, the cam ring 204 is rotated so that the adjustment member 201 is caused to move upwardly, thereby engaging the engaging portion 201b with the rocking lever 226 so as to rotate it in the clockwise direction. Therefore, through the parts from 225 to 222, the free rotation in the clockwise direction of the indicator actuating member 213 is permitted so that the engaging pin 213b engages with the actuating member 201d of the adjustment member 201. Thereafter the actuating member 213 is caused to rotate in the counterclockwise direction again together with adjustment member 201 so that the indicator 219 is caused to rotate by the actuating member 213 through the rack 216, the pinion 217 in mesh therewith and the rotary shaft 218. Thus, as best shown in FIG. 12, the upward movement of the adjustment member 201 is controllably stopped by the engagement of the stepped cam member 201a with the pointer K and simultaneously the indicator actuating member 213 is locked by the pawl 223 at the position where by the corrected scale lines L graduated or calibrated in response to the voltage variation of the battery E is suitably displaced relative to the reading or reference line 220, whereby the error in measurement of the voltage variation of the battery E can be corrected or compensated.

Upon completion of the whole actuation of the winding or charging lever 209, the adjustment member 201 is caused to move downwardly by the engagement of the roller 201c with the cam ring 204 and the spring 202 while the switch Sw is switched from the contact CHECK to the contact ON due to the engagement with the cam plate 207, thereby closing the brightness measuring circuit.

The present invention has been described so far with particular reference to the illustrative embodiments thereof, but it will be understood that the variations and modifications may be effected without departing from the true spirit of the present invention as described hereinabove and as defined in the appended claims.

What is claimed is:

1. In a photographic camera having an exposure meter in which a battery, a photoresistor and a galvanometer are connected in series and a pointer of the galvanometer is displaced in accordance with the voltage of the battery and the resistance of the photoresistor responding to the light from the object, the combination comprising
    a fixed resistor of predetermined resistance connected to the galvanometer,
    switching means selectively connecting the battery either to the photoresistor for measuring intensity of the light or to said fixed resistor for checking voltage of the battery,
    an indication member movable to change the initial setting of the exposure meter responsive to the position of the pointer,
    a detecting member movable perpendicularly with respect to the path of movement of the pointer between an initial position and a plurality of additional positions each of which being representative of a different voltage of the battery and having a cam surface abutting against the pointer in each of said additional positions to select the initial setting of the exposure meter to account for variation of voltage of the battery only when said fixed resistor is connected to the battery by said switching means,
    means for transmitting motion of said detecting member to said indication member, and
    detent means for restraining said indication member in its moved position when said detecting member is returned to said initial position.

2. A camera according to claim 1, wherein said means for transmitting motion includes a sliding plate engageable and movable with said detecting member when the latter is moved to its additional positions, and a return spring for said sliding plate, said indication member having an index and being connected to said sliding plate for moving along the path of movement of the pointer.

3. A camera according to claim 2, wherein said detent means includes a ratchet rack provided on said sliding plate,
    a detent pawl normally engageable with said ratchet rack, and
    a detent pawl normally engageable with said ratchet rack, and
    a pivotable lever connected to said detent pawl,
    said detecting member having a projection engageable with said pivotable lever for disengaging said pawl from said rack when said detecting member starts from its initial position and disengageable from said pivotable lever when said detecting member reaches its additional position.

4. A camera according to claim 3 further comprising means for interconnecting said switching means and said detecting member for moving said detecting member to its additional positions when said fixed resistor is connected to the battery and for moving said detecting member to its initial position when said photoresistor is connected to the battery.

5. A camera according to claim 4, further comprising a shutter charging lever, and wherein said switching means includes a
    rotatable shaft coupled to said shutter charging lever by gearing and rotated by one revolution when the shutter charging lever is moved to its extreme position,
    a switching lever rockable between a first position in which the photoresistor is connected to the battery and a second position in which said fixed resistor is connected to the battery, and a cam plate carried by said rotatable shaft for actuating said switching lever to move from said first position to said second position during the movement of the shutter charging lever.

6. A camera according to claim 5 further comprising
a cam ring carried by said rotatable shaft and connected to said detecting member to reciprocate it.

7. A camera according to claim 6, wherein said indication member is a followup pointer, and wherein
said motion transmitting means includes a followup pointer actuating member slidably provided on the camera body and connected to the exposure factor setting means of the camera,
a pivotable lever on said actuating member having a cam surface and an extending portion engageable with said detecting member for inclining said cam surface in accordance with each of said additional positions of said detecting member, and
a follower normally engaging with said cam surface,
a wire connecting said follower to said followup pointer, and wherein
said detent means includes
a ratchet wheel fixed on said pivotable lever,
a detent pawl normally engageable with said rachet wheel to retain said pivotable lever in its locked position, and
a disengaging lever pivotable on said followup pointer actuating member, one end of said disengaging lever being engageable with said detent pawl and the other end with said detecting member when the latter starts from its initial position.

8. A camera according to claim 6, wherein said indication member is a scale drum having a plurality of curved indices and rotatable about the axis of said drum, said axes being in parallel to the path of movement of the pointer, and wherein
said motion transmitting means includes
a pivotable lever provided on the camera body, one end of said pivotable lever being engageable with said detecting member and the other end of said pivotable lever being coupled to said scale drum by gearing, and wherein
said detent means includes
a rachet wheel fixed on said pivotable lever,
a detent pawl normally engageable with said ratchet wheel to retain said pivotable lever in its locked position, and
a disengaging lever pivotable on the camera body, one end of said disengaging lever connected to said detent pawl and the other end being engageable with said detecting member when the latter starts from its initial position.

* * * * *